(No Model.)
G. F. WHITING.
CUTTING NIPPERS.
No. 532,509. Patented Jan. 15, 1895.
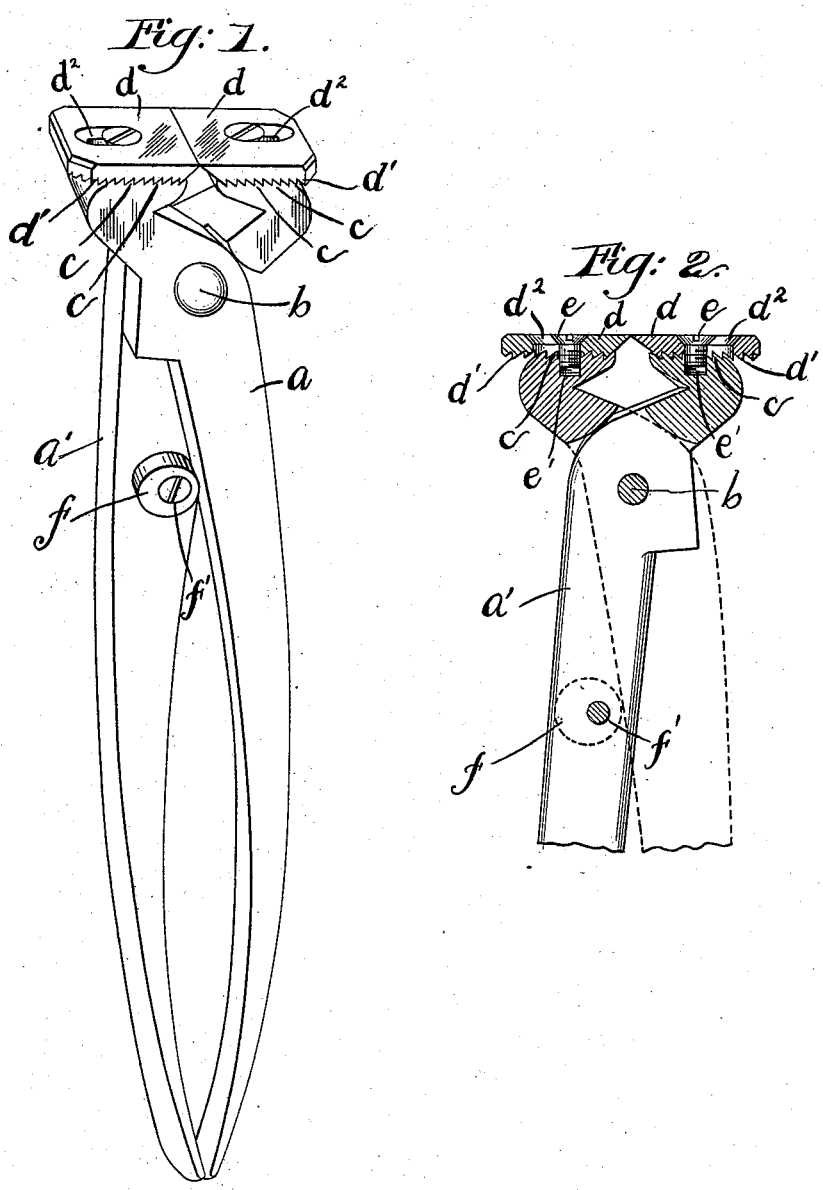
Witnesses:
A. C. Harmon
A. D. Harmon
Inventor:
Geo. F. Whiting
by Wright Brown & Quinby
Attys.

UNITED STATES PATENT OFFICE.

GEORGE F. WHITING, OF CAMBRIDGE, ASSIGNOR TO FRED E. WHITING, OF AUBURNDALE, MASSACHUSETTS.

CUTTING-NIPPERS.

SPECIFICATION forming part of Letters Patent No. 532,509, dated January 15, 1895.

Application filed July 18, 1894. Serial No. 517,910. (No model.)

*To all whom it may concern:*

Be it known that I, GEORGE F. WHITING, of Cambridge, in the county of Middlesex and State of Massachusetts, have invented certain new and useful Improvements in Cutting-Nippers, of which the following is a specification.

This invention has for its object to provide a pair of cutting nippers having adjustable blades which are adapted to be firmly held in any position to which they may be adjusted, and a stop device to limit the closing movement of the blades in accordance with their adjustment and prevent the blades from closing injuriously upon each other.

To these ends, the invention consists in the improvements which I will now proceed to describe and claim.

Of the accompanying drawings, forming a part of this specification, Figure 1 represents a perspective view of a pair of cutting nippers provided with my improvements. Fig. 2 represents a sectional view of the same.

The same letters of reference indicate the same parts in both the figures.

In the drawings, $a\ a'$ represent the two levers or blade-supporting and operating members, the same being pivotally connected at $b$, each lever comprising a longer arm or handle, and a shorter arm. The outer ends of the shorter arms are provided with serrations $c$ constituting serrated seats for the cutting blades $d\ d$. Said blades have serrations $d'\ d'$ on their inner sides, formed to fit the serrations $c$, each serration $c$ being preferably formed with its inner side vertical and its outer side inclined, as shown, this form being best adapted to support the blades against the pressure exerted on them in cutting. Each blade has a longitudinal slot $d^2$ receiving a set-screw $e$, said screws entering tapped sockets $e'$ in the shorter arms of the levers $a\ a'$.

It will be seen that the slots and set-screws enable the blades to be adjusted longitudinally on the arms, while the serrations and set-screws co-operate in securely holding the blades at any position to which they may be adjusted.

$f$ represents an eccentric disk, which is secured by a screw $f'$ to the longer arm of one of the levers in position to bear on the other lever and constitute a stop to limit the closing movement of the blades and prevent their cutting edges from abutting injuriously against each other. By turning the disk $f$ on the screw $f'$, the stop may be adjusted to suit any adjustment of the blades, the screw holding the stop at any position to which it may be adjusted.

The disk $f$ and screw $f'$ are located at one side of the arm which supports them, so that the disk may be turned or adjusted and secured in its adjusted position while the blades are closed. In other words, the blades may be adjusted as to the approach of their cutting edges toward each other by turning the disk when the screw is loosened, and the disk may then be secured while the blades are in their closed position, so that there will be no uncertainty as to the adjustment of the disk.

I claim—

The improved cutting nippers hereinbefore described, the same comprising the pivotally connected levers $a\ a'$ each composed of a longer arm or handle and a shorter arm having serrations on its outer end, the cutting blades having serrations on their inner sides fitting the serrations of the arms, means for detachably securing the blades to the serrated arms, and an eccentric disk located on one of the longer arms and arranged to bear against the other longer arm, and a screw which adjustably secures the disk to the arm on which it is located, said disk constituting an adjustable stop adapted to limit the closing movement of the blades in accordance with their adjustment on the serrated shorter arm.

In testimony whereof I have signed my name to this specification, in the presence of two subscribing witnesses, this 14th day of July, A. D. 1894.

GEORGE F. WHITING.

Witnesses:
C. F. BROWN,
A. D. HARRISON.